April 27, 1943. A. RAKOS 2,317,483
METHOD OF WELDING, SOLDERING, AND FUSING METALS TOGETHER
Filed Oct. 13, 1938   3 Sheets-Sheet 2

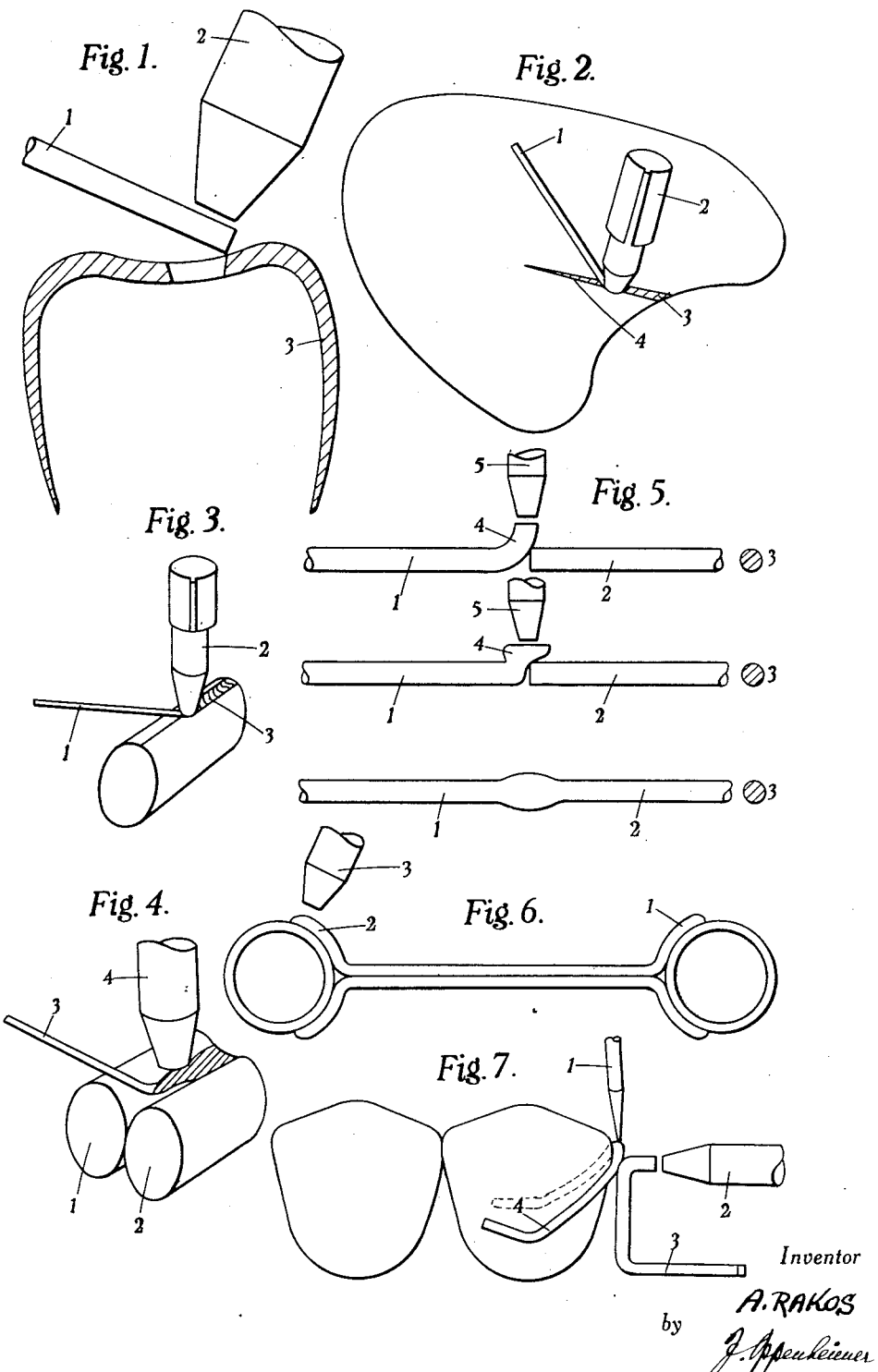

Inventor
A. RAKOS
by
Attorney

April 27, 1943.  A. RAKOS  2,317,483
METHOD OF WELDING, SOLDERING, AND FUSING METALS TOGETHER
Filed Oct. 13, 1938  3 Sheets-Sheet 3

Inventor
A. RAKOS
by
Attorney

Patented Apr. 27, 1943

2,317,483

UNITED STATES PATENT OFFICE 2,317,483

METHOD OF WELDING, SOLDERING, AND FUSING METALS TOGETHER

Alexander Rakos, London, England

Application October 13, 1938, Serial No. 234,794
In Austria and Germany October 14, 1937

9 Claims. (Cl. 219—10)

This invention relates to methods of welding, soldering and fusing metals together. Owing to the diffusion of heat which occurs when operations such as welding, soldering and fusing together of metals are carried out, the work often undergoes undesired alterations in shape, structure or composition. For example, seam-welded plates become distorted as do also annealed tubes when hard soldered; certain aluminium alloys become brittle and the resistance to corrosion of austenitic chrome-nickel steels of various kinds is reduced. Articles which consist partly of the metal to be treated and partly of a material which may not be subjected to the temperature to which the metal part is subjected, such as enameled plates, insulated wires, pieces of metal provided with soft soldered parts or combined with materials which are not resistant to heat, for example hard rubber, fibre or artificial resin, and metallic parts which are in contact with living substances, may be considerably damaged and rendered unsuitable for the purpose for which they are intended to be used.

The present invention enables thermal treatments, such as welding, hard soldering and particularly fusing together of metallic substances, to be carried out, both at separate points and in continuous lines, with the avoidance of such damages both in the vicinity of the places which are subjected to treatment as well as at these places themselves.

By using a welding iron which is preferably made of a material of low electrical conductivity and is suitably connected in series with the work and with a low-voltage source of current of high amperage, it is known to produce a steep temperature drop at the surface at which the welding iron makes contact with the work and in this way to effect local spot welding and soldering before the heat spreads by conduction to the work and thereby produces undesirable injury. However, with a process of this nature only damage to the adjacent heat-unresistant material can be avoided, since the zones where a harmful heat effect occurs, although being reduced to a restricted region around the welded spot, are not entirely suppressed and the process therefore cannot be used when thermal damage must also be avoided within a such restricted region, for example, when welding chrome-nickel steels the resistance to corrosion of which must be maintained at all parts of the work. Further a process of this nature permits only welding and soldering operations to be carried out but not homogeneous fusions which require a much stronger thermal action.

Experiments which have been made by the applicant in this connection have proved that the reason for this is that, at the place of contact between the welding iron and the work owing to its small extent and because the two solid bodies which are never exactly parallel only make contact at points, there is in addition to the high electrical resistance which is favourable to the development of heat also a high thermal resistance, which limits the steepness of the temperature drop owing to the fact that the heat developed in the welding iron is not able to flow away sufficiently quickly to the work.

The invention will be more clearly understood when the specification proceeds with reference to the drawings wherein by way of exemplification, Fig. 1 shows partly in cross section and partly in elevation an improved way of fusing up a hole in a crown cap of a tooth, Fig. 2 in perspective view welding up a crack in a denture plate, Fig. 3 in a similar view welding of a seam of a metal tube, Fig. 4 in a similar view welding together of two metal tubes, Fig. 5 in elevation three consecutive steps of connecting two wires by welding, Fig. 6 in elevation welding of the ends of wires to rings, Fig. 7 in elevation welding of a wire to another one, Fig. 8 in side elevation and partly in cross section welding of a platinum pin to a protecting plate, Fig. 9 in a similar way welding of a crown onto a tooth, Fig. 10 in a view from above welding of a broken metal clip to a dental plate, Fig. 11 in elevation welding an addition to a dental plate, Fig. 12 in elevation and Fig. 13 in a perspective view welding of a fracture of a denture plate, Fig. 14 in view from below, Fig. 15 is a perspective view and Fig. 16 in cross section welding of a fracture of a denture, Figs. 17 to 20 various steps partly in elevation and cross section, respectively of welding two plates together, and Fig. 21 in elevation welding of two parts of a work.

The present invention is based on the consideration that, by eliminating or substantially reducing the transitional thermal resistance and maintaining the electrical resistance, the temperature drop can be made so steep that on the one hand not only welding and soldering but also homogeneous fusion can be effected with the avoidance of any thermal damage and, on the other hand, the entire process of heating and cooling down takes place so rapidly that it is completed before any undesired alteration in structure, which can only occur if the duration of heating exceeds a certain minimum time, takes place at any part, even at the surface of contact itself.

The difficulty which the present invention has to overcome now is that the thermal transitional resistance is, in general, determined by the same circumstances as the electrical and therefore the one cannot be directly eliminated without the other. The present invention overcomes this difficulty in that, in accordance with the invention the welding iron is not applied as in the known processes to the work itself but is exclusively applied to extra material which is provided for this purpose. In this way the thermal process is split up into two phases. In the first place the extra material is heated to a temperature greatly above the melting point of the work (if there are several pieces of work having different melting points it is heated to a temperature above the highest of these) and melts and makes contact in a liquid form with the work over a wide area and therefore intimately and with considerably reduced thermal resistance and by rapid heat transfer to the work melts the latter at the surface of contact, so that the work intimately combines or alloys locally with the extra material or melts homogeneously together, according as whether a material which adheres to the material of the work or alloys with it or fuses homogeneously with it is employed as the extra material.

The preheating of the extra material which, in the process of the invention, is the main carrier of the whole of the thermal energy effecting the union can take place by the direct action of the welding iron or, if this is not feasible, by indirect action of the welding iron with the application of a suitable intermediate layer. It can, however, also be effected by other heating means provided the heat effect is directed, in accordance with the invention, solely to the extra material and not to the work, because in the process according to the present invention the source of heat itself does not come into contact at all with the work and its nature is therefore unimportant. The important feature is only that the source of heat is such that the thermal effect can be sufficiently concentrated as regards place and in some cases also as regards time to enable the thermal effect to be directed exclusively to the extra material.

This pre-heating of the extra material must in any case be carried so far above the melting point of the work that the heat content of the extra material is such that it is able to supply the quantity of heat necessary for effecting the welding, alloying or fusion with the work at the surfaces which are in contact.

The less the heat spreads by conduction through the work, the shorter the time of action and therefore the higher the temperature of the extra material, the better is the result. The temperature is limited upwardly only by the increasing and finally injurious vapour pressure so that, in selecting the extra material, attention has to be paid, somewhat surprisingly, more to its boiling point than to its melting point, and a material of which the melting point is lower than, the same as or higher than the melting point of the work can be employed provided this material is liquid at the temperature to be given it and the vapour pressure is not injurious.

Thus, in accordance with the invention, platinum may be used for effecting the thermal union of two pieces of gold and copper for two pieces of brass, that is to say in general "solders," the melting point of which lies far above that of the work, are used. For obtaining an intimate and firmly adhering union it is advantageous to select a material of such a kind that an intimate alloying or homogeneous fusion with work takes place.

Also several extra materials can be employed simultaneously, the above-mentioned conditions being observed, and finally intermediate metallic alloy layers can be interposed between the electrodes and the extra material, should this additional measure appear to be desirable for any reason, for example for obtaining an equalization of heat, for influencing the alloy formed, for forming the weld, for determining the direction of the solder or for protecting the extra material from the direct action of the source of heat. Thus, for example in the methods in accordance with the invention which are hereinafter illustrated in Figures 9-16 of the drawings, solder is melted on one side of a strip of a metal which melts at a higher temperature than the solder and the work and is applied in this manner to the places to be soldered, the action of the heat being then directed only on to the strip of metal and on to the side of it which is not covered with the solder.

In many cases it is advantageous to employ excess material as the extra material, that is to say material of the same kind as the material of the work, which is preferably not applied separately but is provided on the work itself, the work being arranged to have projecting edges, flanges or ends which are overheated and melted down. Such an arrangement of work to be welded is known in various forms, but in the methods of the present invention the action of the source of heat is exclusively directed on to this excess material.

The method of the present invention can also be used for the thermal treatment not only of individual points in metallic materials but also of continuous lines, for example along a seam, a joint or a crack, in which case the local duration of the action of the source of heat is determined by the speed with which the welding iron or other source of heat is moved along the line, the thermal action being directed in accordance with the present invention exclusively to extra or excess material which is provided and not to the work itself. In the case of many materials, such as chrome-nickel steel, aluminium and its alloys, it has been found advisable by suitably regulating the speed of welding in relation to the constants of the material and welding output to form and maintain between the electrode and the work, a molten drop which quickly gives up the heat supplied to it by the source of heat to the work at both surfaces of contact over a sufficiently wide area and with the necessary reduction of the thermal transitional resistance.

In order that the invention may be readily understood and carried into effect, reference will now be made to the accompanying drawings which illustrate various examples of methods in accordance with the invention.

Figure 1 represents the fusing up of a hole in the metallic crown cap of a tooth. In this figure the numeral I denotes the extra material, 2 the welding iron and 3 the metallic crown.

Figure 2 illustrates the welding up of a crack in a plate of metallic material to which it is injurious to heat above a temperature lying within a definite critical range. In this figure the numeral 1 denotes the extra material, 2 the welding iron, 3 the finished seam and 4 the part of the crack which is still unwelded.

Figure 3 represents the welding of a seam in a metal tube with the use of extra material. In this figure, 1 denotes the extra material, 2 the welding iron and 3 the welded seam.

Figure 8:
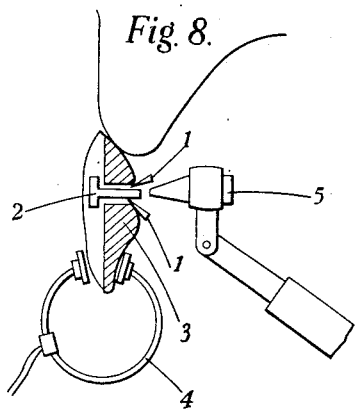

Figure 4 illustrates the welding together of two metal tubes made of sheet metal, which is less than ½ m. m. in thickness, with the use of extra material. A joint of this kind cannot be made by any method of welding hitherto known. In this figure, 1 and 2 denote the two tubes, 3 the additional material and 4 the welding iron.

In contradistinction to the above-mentioned figures which illustrate how the method is carried out with the use of extra material, the Figures 5, 6 and 7 explain how the method is carried out with the use of excess material which is provided on the work itself.

Figure 5 shows the fusing together by the method of the invention of the ends of two wires. In this figure 1 and 2 are the wires, which are shown in cross section at 3, and 4 the excess material which is obtained by bending up the end of one of the wires while 5 is the welding iron.

Fig. 5a shows the phase in which the bent up end 4 is melted, thereby deformed, and just contacts the adjacent end of wire 2, whereby the latter is melted, and eventually completely fuses and coalesces with portion 4 and thereby wire 1, as shown in Fig. 5b.

Figure 6 illustrates the welding of the ends of wires to two rings. In this figure 1 indicates the weld, 2 the excess material obtained by extending the wires and 3 the welding iron.

Figure 7 illustrates the fusing of an end of a wire to a wire in T-shape by means of excess material which is obtained by extending and bending up the end of the wire, and is melted down on the other wire. In this figure, 1 indicates the countercontact, 2 the welding iron, 3 the end of the wire and 4 the other wire.

Figure 8 illustrates the use of two kinds of additional material. In this figure a platinum pin 2 is of such a length that its end can be used as the excess metal which is to be melted down to a protecting plate 3, and further additional material in the form of pieces 1 of hard solder is also applied. In most cases the pin 2 will be made of platinum, the plate 3 of gold and the pieces 1 of gold solder. In this figure the numeral 4 designates the counter-contact and 5 the welding iron.

It will be clear from these figures how the extra material is supplied and how the welding iron is applied in order to direct the heat only on to the extra material.

Figure 9:
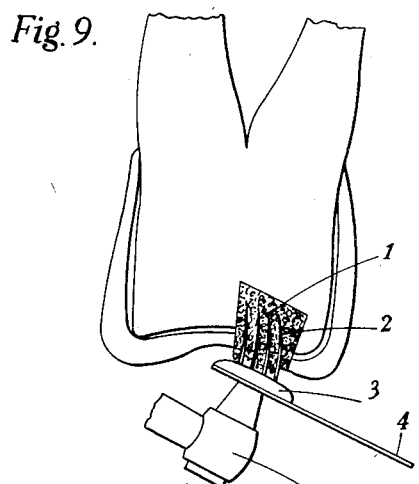
Figure 10:
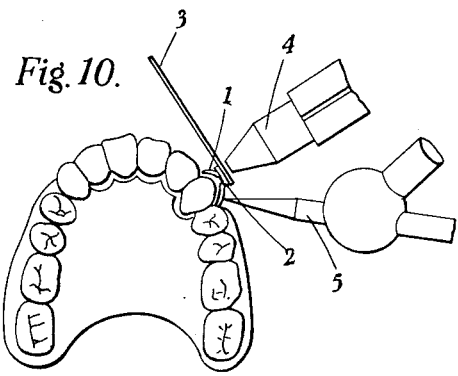
Figure 11:
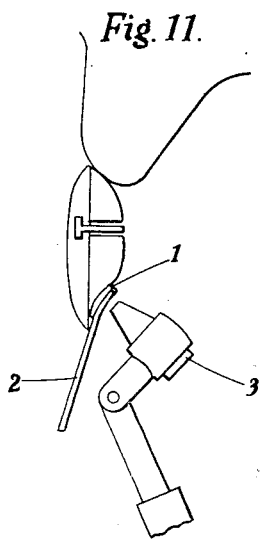

Figures 9, 10 and 11 illustrate how the process of the invention is carried out using soldering material applied to a strip of platinum or a strip of another metal which melts at a higher temperature than the solder and the work. Figures 12-16 explain particular cases in which it is advisable to fix a rider of solder, which conforms to the shape of the soldered joint in the solder applied, in order to fill the intermediate space better and more quickly. Figure 9 illustrates the welding of a perforated metal crown in the mouth of a patient. Stopping gold 1 is pressed into the cavity and pieces 2 of a metal which melts at a temperature higher than the solder and the work, for example pieces of platinum or platinum-iridium, are also pressed into the cavity. Solder 3 is fused on to one side of a strip of metal of high melting point, for example a platinum strip 4. This strip is now placed with its side which is covered with solder on the place to be treated, that is to say on the gold stopping and the pieces 2 which project from the cavity. After this the welding iron 5 is applied, opposite the place to be treated, to the side of this strip which is not covered with solder and the thermal action is thus applied directly only to the strip. The result is that a combined welding and soldering of all the metallic components present to form a dense and compact metal crown takes place within so short a time that any damage by heat is out of the question.

Figure 10 illustrates the welding of a broken gold clip to a rubber dental plate. The broken part 1 of the gold clip is placed in the proper position. Then a strip 3 which is covered on one side with gold solder 2 and is preferably cut from a sheet of platinum is laid on the fracture. The strip 3 is then touched with the counter contact pin 5 and thereby connected to the source of current, after which the welding iron 4 is applied to the strip.

Figure 11 illustrates how an addition is made to a dental plate. A gold solder 1 is melted on one side of a strip 2, as described, and the strip is held with the soldered side against the place to be treated, and the welding iron 3 is then applied to the strip. On connecting the current for a short time this strip and indirectly the solder adhering to it is heated to a temperature which is considerably above the melting point of the metal of the dental plate which may consist, for example, of 22 carat gold. The highly heated solder which is liquefied in this manner comes into contact with the gold of the dental plate over a relatively wide area and melts this, owing to the rapid transfer of heat, at the surface of contact and unites homogeneously with it. By this means the strip which carries the solder is soldered on as well. In this case it is preferable not to remove it as in other cases by cutting it off and smoothing it but to cut off only such a length that what remains can be turned over the cutting edge of the tooth to force a fresh cutting edge or protection.

From the examples which have been given the difference between the methods of the present invention and the methods mentioned at the beginning of this specification which are not suitable for use in such cases will be clear. It is impossible by means of thermal action directly applied to the work itself to effect such thermal unions without causing injury by heat.

Figures 12-16 show special uses of metal strips by which solder is supplied in accordance with the present invention, which include the welding of a fracture in a tooth bridge in the mouth of the patient or in the vicinity of substances not resistant to heat.

Figure 12:
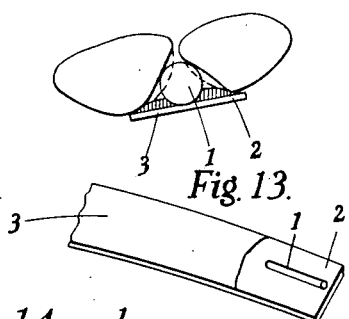
Figures 13, 15, 16:
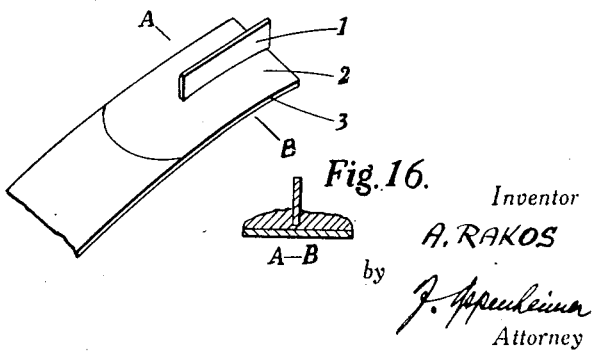

Figures 12 and 13 illustrate the welding of such a fracture of a large cross section in which a relatively large space has to be filled up.

Figure 14:
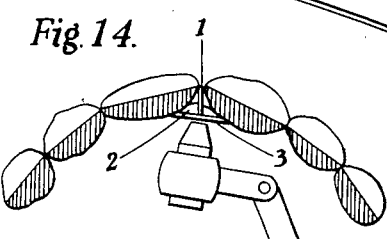

Figures 14, 15 and 16 show the welding up of a crack-like fracture. As illustrated, a piece of solder 2 is melted on to one side of a strip of platinum 3 and a solder bar 1 is inserted in this solder while still liquid. The bar 1 is in the form of an approximately circular wire as shown in Figure 13, or in the form of a plate as shown in Figure 12, according to the shape of the fracture, or it can be made to conform in any other suitable manner to the shape of the space to be filled The strip which has been prepared in this manner is applied in the proper position, as explained above, to the fracture and the welding iron is applied opposite the fracture to the side of the strip which is not covered with solder.

Figures 17–20 explain by way of example one practical method of carrying the invention into effect in which, as in Figures 5–8, no additional material is supplied, but an excess of material on which the thermal action is directed is provided on the work itself.

Figure 20:
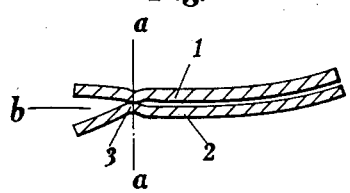

This application of the invention is concerned with the hand welding of so-called double plates. Dental palate plates and saddle plates made of alloys which do not contain precious metals but are nevertheless resistant to corrosion are used to an increasingly great extent for dental purposes. These plates have to adhere to the corresponding parts of the mouth by suction and for this purpose must be impressed so as to correspond exactly to the parts in question. This impression can only be made under very high pressures and with the use of particularly hard matrices because it has been found by experience that the thickness of such plates must amount to at least 0.35–0.45 mm.; even then the impression may not be sufficiently accurate because, for example, indentations or folds in the palate which are of less depth than the thickness of the plate cannot be impressed. For this reason and to enable such plates to be made with the use of considerably smaller pressure and with less hard and therefore more easily flowing matrices, so they can be conveniently and accurately made in a private laboratory, so-called double plates have been adopted. These consist of two plates each of which is half the thickness of a single plate and they can easily be impressed in any dental rubber press using matrices made of easily flowing metals. The two plates, after they have been impressed in known manner, must be rigidly united in order to make one piece which is equivalent to a simple plate. This union has hitherto been effected either by spot welding or by soldering. The disadvantage of spot welding is illustrated in Figure 20. As shown in Figure 20, a cavity remains between the edges of the plates at the point $b$ which becomes filled with particles of food and putrefactive juices. Further the edges are not smooth but rub on the parts of the mouth with which they come into contact. A removal of material approximately to the line $a$–$a$ would weaken, however, the welding and would increase the uncertainty as to whether the internal space is tightly closed. Soldering, on the other hand, is disadvantageous because for this purpose the plates must be heated whereby the distortion of the plates which is unavoidable will usually render them useless; further when the solder, the composition of which owing to its lower melting point is necessarily different from that of the plates, comes into contact with the juices in the mouth local galvanic elements and couples are formed and impair and reduce the resistance of the plates to corrosion. The only course remaining open, namely the continuous welding smooth of the edges by fusion could not hitherto be taken because such welding or fusion caused damage due to the action of heat; distortion and warping occurred in all cases, and in most cases also, when a metal plate is employed, heating it to a certain critical temperature causes alterations in structure and a reduction of the resistance which it has to corrosion and which is essential in view of the purpose for which the plate is to be used. A subsequent heat treatment with the object of eliminating these faults is impossible owing to distortion which it would produce.

Figure 17:
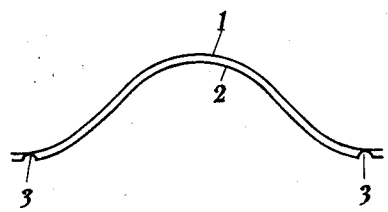
Figure 18:
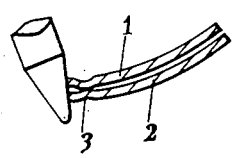
Figure 19:
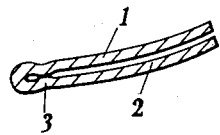

According to the present invention, the procedure is carried out in the manner illustrated in Figures 17–19. The plates 1 and 2 illustrated in Figure 17 are united at some points 3, 3 by means for example of a spot welding apparatus and the edges are allowed to project beyond the desired dimensions in order to gain some excess material. The welding iron is applied to these projecting edges, which are illustrated to an exaggerated extent in Figure 18, and is moved backwards and forwards several times along these edges whereby, in the manner which has already been described in the previous examples, a dense and smooth homogeneous and therefore corrosion resistant closed edge is formed without causing any damage by the heating.

By carrying out this step in accordance with the invention the parts to be united do not come into contact at all with the source of heat and consequently any direct injurious thermal action is eliminated, because only so much heat is supplied to the parts of the work as is necessary for the local fusion within the surfaces with which the excess material is in contact and this takes place within so short a time that an alteration in structure does not take place. The further result is thereby obtained that the heated parts to the work-pieces are not exposed to the harmful influence of air, since the work is heated only at the surface which is in contact with the additional or excess material to which the air has no access. If, therefore, so much additional material is taken that the surface can be sufficiently smoothed after solidification, or if an additional material like platinum is employed, which is not attacked by air even in the heated condition compounds are obtained, the quality of which is not impaired even if they should be exposed to the action of the atmosphere.

Figure 21:
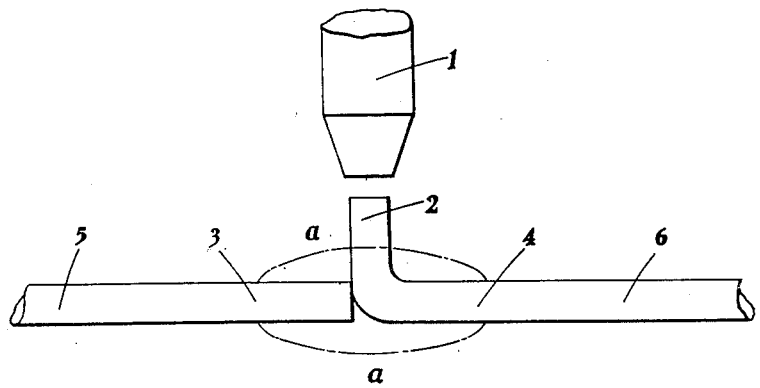

As compared with the known processes the process according to the present invention has, among others, the important advantage that the whole of the oxide which accumulates at the place where the thermal action takes place is reduced to a fraction of the amount previously obtained. Thus, as is illustrated in Figure 21, since the direct thermal action by means of the welding iron 1 acts only on the extra material there is no direct thermal action on the work 3, 4 and in the second place the thermal action takes place only at the moment when the molten excess material has sunk down along the dotted line $a$—$a$, or along the surface of the body of revolution the longitudinal section of which is represented by this line, and makes contact with the work over a wide area and with the exclusion of air, so that in consequence of the steep temperature drop further parts 5, 6 of the work are not thermally affected and oxidation can therefore only occur at the surface of the excess material along the surface $a$—$a$ where it is harmless as this superficial part can be removed.

The scope of the present invention is not limited by the examples which have been given in order to explain the invention but is determined by the claims which are hereinafter appended. The invention is therefore by no means limited to the use of a welding iron as a source of heat nor to use in dentistry. The examples which have been given have mainly been selected in this respect because they are clearly distinguished from the known processes of a similar nature. For example the process according to the present invention can be usefully employed by jewellers, goldsmiths, opticians and like craftsmen.

I claim:

1. In a method of uniting pieces of a work, such as a denture, of metal by means of additional metal which is freely exposed to the outside, heated and caused to weld adjacent portions of said pieces also being exposed to the outside, the steps of arranging additional metal of a melting point at least as high as that of those pieces close to and on the exposed side of said portions, supplying from without concentrated and localized heat sufficing to melt said additional metal and heat it rapidly to a temperature considerably above the melting temperature of said portions exclusively to said additional metal from said exposed side, thereby melting said additional metal and portions, and cooling said melted additional metal and portions so that they coalesce homogeneously and form a weld between said pieces.

2. In a method of uniting pieces of metal by means of additional metal which is freely exposed to the outside, heated by electric current and caused to weld adjacent portions of said pieces being also exposed to the outside, the steps of arranging said additional metal of a melting point at least as high as that of said pieces in contact with and on the exposed sides of said portions, including said additional metal in an electric circuit comprising a source of current and a high resistance electrode having a small contact area, said current sufficient to heat said electrode and by it said additional metal rapidly so as to melt said additional metal and raise its temperature considerably above the melting temperature of said portions, thereby causing said melted additional metal to melt said contacted portions by conveyance of heat, and cooling said additional metal and melted portions so that they coalesce and form a weld between said pieces.

3. In a method of welding up a hole in a denture of metal by means of additional metal which is heated and caused to weld up said metal, the steps of filling said hole with stopping metal and pieces of metal of higher melting point than said denture, said stopping metal contacting the portion of the denture surrounding said hole, melting solder unto one side of a strip of metal of higher melting point than that of the solder and the denture, contacting said stopping metal and pieces with said solder, supplying a localized and concentrating heat from without exclusively to the other side of said strip so as to heat said strip and solder thereon rapidly to a temperature considerably above the melting temperature of said solder, stopping metal and pieces and cause them to weld with said portion surrounding said hole, so that upon cooling said portion, stopping metal, pieces and solder form a compact unit.

4. The method of repairing dental attachments in the mouth of the patient which comprises applying solder to one side of a strip of metal of higher melting point than the part to be repaired, applying the soldered strip to the said part, applying a localised and concentrated source of heat to the said strip sufficient to melt said strip and solder and to heat them to a temperature considerably above the melting temperature of the said part, so that it melts the contacted surface of said part and unites homogeneously with it.

5. A method of joining metal by the action of heat which comprises applying solder to one side of a strip of metal of higher melting point than that of both the solder and of the metal to be treated and of a shape corresponding to that of the space between the parts to be joined, applying the soldered piece of metal to the work, and applying a localised and concentrated source of heat to the said piece of metal sufficient to melt said strip and solder and to heat them to a temperature considerably above the melting temperature of the work, so that it melts the contacted surface of said work and units homogeneously with it.

6. In a method of welding juxtaposed portions being exposed to one side of a work, such as a denture, of metal, as exemplified by gold, by including for a short time said portions in an electrical low voltage and high amperage circuit in series with an electrode, the steps of connecting in series in said circuit said portions and an electrode of high electrical resistance, positioning a piece of additional metal of considerably higher melting point than that of the work, and exemplified by platinum, onto said exposed side of said portions, exclusively contacting said piece from said exposed side by said electrode and closing said circuit so that said electrode is rapidly heated to a temperature considerably above the melting temperature but below the boiling point of said additional metal piece and exclusively supplies the latter with concentrated and localized heat sufficient to rapidly heat and melt it and thereby to melt by conveyance of heat said contacted portions so that said piece and portions coalesce locally and homogeneously, and upon interrupting said circuit after a short time and on cooling form a weld.

7. In a method of welding juxtaposed portions being exposed to one side of a work, such as a denture, of metal, as exemplified by gold, by including for a short time said portions in an electrical low voltage and high amperage circuit in series with an electrode, the steps of connecting in series in said circuit said portions and an electrode of high electrical resistance and narrow contact area, positioning a piece of additional metal of considerably higher melting point than that of the work, and exemplified by platinum, between juxtaposed edges of said portions so that said metal piece is accessible from said exposed side and is supported by said edges, exclusively contacting said piece from said exposed side by said electrode and closing said circuit so that said electrode is rapidly heated to a temperature considerably above the melting temperature but below the boiling point of said additional metal piece and exclusively supplies the latter with concentrated and localized heat sufficient to rapidly heat and melt it and thereby to melt by conveyance of heat said contacted portions so that said piece and portions coalesce locally and homogeneously, and upon interrupting said circuit after a short time and on cooling form a weld.

8. In a method of welding juxtaposed portions being exposed to one side of a work, such as a denture, of metal, as exemplified by gold, by including for a short time said portions in an electrical low voltage and high amperage circuit in series with an electrode, the steps of connecting in series in said circuit said portions and an electrode of high electrical resistance and narrow contact area, positioning a piece of additional metal of considerably higher melting point than that of the work, and exemplified by platinum, onto and above said exposed side of said portions, exclusively contacting said piece from said exposed side by said electrode and closing said circuit so that said electrode is rapidly heated to a temperature considerably above the melting temperature but below the boiling point of said additional metal piece and exclusively supplies the latter with concentrated and localized heat sufficient to rapidly heat and melt it and thereby to melt by conveyance of heat said contacted portions so that said piece and portions coalesce locally and homogeneously, and upon interrupting said circuit after a short time and on cooling form a weld.

9. In a method of soldering and welding juxtaposed portions being exposed to one side of a work, such as a denture, of metal, as exemplified by gold, by including for a short time said portions in an electrical low-voltage and high amperage circuit in series with an electrode, the steps of connecting in series in said circuit said portions and an electrode of high electrical resistance and narrow contact area, combining on one side a piece of additional metal of considerably higher melting point than that of the work, and exemplified by platinum, with a hard solder, positioning said piece with said solder thereon onto said exposed side of said portions so that said solder is between said piece and said portions, exclusively contacting said piece from said exposed side by said electrode and closing said circuit so that said electrode is rapidly heated to a temperature considerably above the melting temperature but below the boiling point of said additional metal piece and exclusively supplies the latter with concentrated and localized heat sufficient to rapidly heat and melt it and thereby to melt by conveyance of heat said solder and said contacted portions so that said piece, solder and portions coalesce locally, and upon interrupting said circuit after a short time and on cooling form a soldered weld.

ALEXANDER RAKOS.